(12) United States Patent
Zhou

(10) Patent No.: US 11,199,217 B2
(45) Date of Patent: Dec. 14, 2021

(54) QUICK ACTION NUT AND THREADED FASTENER ASSEMBLY INCLUDING THE SAME

(71) Applicant: Zhongshan Meitu Plastic. Ind. Co., Ltd., Zhongshan (CN)

(72) Inventor: Wenhui Zhou, Zhongshan (CN)

(73) Assignee: Zhongshan Meitu Plastic. Ind. Co., Ltd., Zhongshan (CN)

( * ) Notice: Subject to any disclaimer, the term of this patent is extended or adjusted under 35 U.S.C. 154(b) by 182 days.

(21) Appl. No.: 16/527,063

(22) Filed: Jul. 31, 2019

(65) Prior Publication Data

US 2020/0040932 A1    Feb. 6, 2020

(30) Foreign Application Priority Data

Jul. 31, 2018 (CN) .......................... 201821221955.X

(51) Int. Cl.
    *F16B 37/08* (2006.01)
    *F16B 37/14* (2006.01)

(52) U.S. Cl.
    CPC ........ *F16B 37/0864* (2013.01); *F16B 37/145* (2013.01)

(58) Field of Classification Search
    CPC ...... F16B 37/0864; F16B 37/145; F16B 2/06; F16B 2/12; F16B 2/18; F16B 7/1418; F16B 39/36
    USPC .................................. 411/433, 970, 277, 279
    See application file for complete search history.

(56) References Cited

U.S. PATENT DOCUMENTS

| | | | | |
|---|---|---|---|---|
| 1,211,387 A | * | 1/1917 | Beck ................... | F16L 37/1215 285/34 |
| 2,267,252 A | * | 12/1941 | Pitsch ................... | F16L 37/252 285/34 |
| 2,463,179 A | * | 3/1949 | Iftiger, Sr. ........... | F16L 37/1215 285/34 |
| 2,984,144 A | * | 5/1961 | Erdmann ................ | F16B 39/36 411/434 |
| 4,930,961 A | * | 6/1990 | Weis ................... | F16B 37/0864 411/266 |
| 5,755,544 A | * | 5/1998 | Muller ................ | F16B 37/0864 285/34 |
| 6,702,504 B2 | * | 3/2004 | Fries ...................... | B23H 9/003 403/322.1 |
| 6,974,291 B2 | * | 12/2005 | Li ....................... | F16B 37/0864 411/267 |

(Continued)

*Primary Examiner* — Flemming Saether
(74) *Attorney, Agent, or Firm* — Bayramoglu Law Offices LLC

(57) ABSTRACT

A quick action nut and a threaded fastener assembly including the quick action nut are proposed in the present invention. The quick action nut includes a nut housing, a control operating member, and at least two moving blocks movably connected inside the nut housing. A first through hole having a first hole axis is provided on the nut housing for a screw to pass through. Radial slide ways are provided on the nut housing for the moving blocks to move in a direction perpendicular to the first hole axis. The radial slide ways and the moving blocks have the same quantity, are matched in a one-to-one correspondence, and are distributed around the first hole axis. Threads are provided on the moving block to form or not form a threaded hole structure that is matched with the screw.

12 Claims, 6 Drawing Sheets

(56) References Cited

U.S. PATENT DOCUMENTS

| | | | |
|---|---|---|---|
| 9,511,636 B2* | 12/2016 | Kuo | F16L 37/138 |
| 10,329,036 B2* | 6/2019 | Cassanelli | B64G 1/641 |

* cited by examiner

QUICK ACTION NUT AND THREADED FASTENER ASSEMBLY INCLUDING THE SAME

CROSS REFERENCE TO RELATED APPLICATIONS

This application is based upon and claims priority to Chinese Patent Application No. 201821221955.X, filed on Jul. 31, 2018, the entire contents of which are incorporated herein by reference.

TECHNICAL FIELD

The present invention relates to a threaded fastener, and particularly to a quick action nut and a threaded fastener assembly including the same.

BACKGROUND

The existing quick release nut in the market simply offers a fast fastening feature but not fast releasing. Moreover, the nut, without a self-locking function, is likely to become loosened.

SUMMARY

In order to solve the above problems, the present invention proposes a quick action nut which can be fastened or released quickly and is convenient in use. As a further improvement, the present invention has the advantages of sufficient fastening strength and loose-proof feature.

The present invention further provides a threaded fastener assembly.

The present invention is realized by the following technical solutions.

A quick action nut includes a nut housing, a control operating member, and at least two moving blocks movably connected inside the nut housing, wherein, the nut housing has a first through hole for a screw to pass through, the first through hole has a first hole axis, the nut housing further includes radial slide ways for the moving blocks to move inside the radial slide ways in a direction perpendicular to the first hole axis, the radial slide ways are equal to the moving blocks in quantity, the moving blocks are matched with the radial slide ways in a one-to-one correspondence, the moving blocks and the radial slide ways are distributed around the first hole axis, threads are provided on a side of each moving block facing the first hole axis, the control operating member is connected to the nut housing and has two matching states with the nut housing, and the two matching states include a first matching state and a second matching state; when the control operating member and the nut housing are in the first matching state, all of the moving blocks are located at inner ends of the radial slide ways near the first hole axis and the moving blocks are held at the inner ends; when all of the moving blocks are located at the inner ends of the radial slide ways, the threads on the moving blocks gather around to make a threaded hole structure matched with a screw; when the control operating member and the nut housing are in the second matching state, all of the moving blocks do not stay at the inner ends of the radial slide ways, so the threaded hole structure is not formed.

As a preferred embodiment, further, a second through hole aligned with the first through hole is provided on the control operating member for the screw to pass through, the control operating member is connected to the nut housing in a manner allowing a relative rotation around the same rotation axis, a rotation axis of the relative rotation between the control operating member and the nut housing coincides with the first hole axis, and the control operating member includes limiting blocks equal to the moving blocks in quantity and matched with the moving blocks in a one-to-one correspondence; a rotation of the control operating member relative to the nut housing has two rotation limit positions including a first rotation limit position and a second rotation limit position; when the control operating member is rotated relative to the nut housing to the first rotation limit position, the limiting blocks on the control operating member squeeze the moving blocks into the inner ends of the radial slide ways to make the control operating member and the nut housing be in the first matching state; when the control operating member is rotated relative to the nut housing to the second rotation limit position, the limiting blocks on the control operating member are away from the moving blocks to not match with the moving blocks, so that the control operating member and the nut housing are in the second matching state.

As a preferred embodiment, further, a first squeezing inclined surface is provided at an inner side of each limiting block, an outer wall surface of each limiting block faces opposite to an inner wall surface of the nut housing, a second squeezing inclined surface matched with the first squeezing inclined surface is provided at an outer side of each moving block, the moving blocks have a degree of freedom of motion in the radial slide ways along a direction of the first hole axis, and the moving blocks are sandwiched between the nut housing and the control operating member at upper and lower ends of the moving blocks; as the threads of the moving blocks are gathering around to fasten the screw, all of the first squeezing inclined surfaces and the second squeezing inclined surfaces are getting closer to the first hole axis in an axial translation direction.

As a preferred embodiment, further, the nut housing includes arc-shaped slide ways matched with the limiting blocks in a one-to-one correspondence for the limiting block to move in the arc-shaped slide ways, and the arc-shaped slide ways are connected to the radial slide ways in a one-to-one correspondence; when the limiting blocks move to positions on the arc-shaped slide ways connected to the radial slide ways, the control operating member is at the first rotation limit position; and when the limiting blocks move in the arc-shaped slide ways to ends away from the moving blocks, the control operating member is at the second rotation limit position.

As a preferred embodiment, further, when the control operating member is rotated relative to the nut housing from the second rotation limit position to the first rotation limit position, a rotation direction of the control operating member is identical to a rotation direction of the moving blocks when the threads of the moving blocks are gathering around to fasten the screw, the nut housing includes a limiting surface for constraining a further rotation of the control operating member relative to the nut housing when the control operating member is at the first rotation limit position.

As a preferred embodiment, further, the inner wall surfaces of the limiting blocks are matched with the outer wall surfaces of the moving blocks in shape, the inner wall surfaces of the limiting blocks and the outer wall surfaces of the movable blocks are both cylindrical surfaces, and two sides of both of the inner wall surfaces of the limiting blocks and the outer wall surfaces of the moving blocks are formed with round corners.

As a preferred embodiment, further, a pair of the moving blocks are provided, a pair of the arc-shaped slide ways are provided, a pair of the radial slide ways are provided, and outer ends of the radial slide ways away from the first hole axis are connected to the arc-shaped slide ways in a one-to-one correspondence.

As a preferred embodiment, further, an opening is provided at an end side of the inner end of each radial slide way, a width of the opening is smaller than a width of the inner end of each radial slide way, limiting shoulders are provided at two ends of the opening, and the inner ends of all the radial sliding ways are interconnected to each other through the openings.

A threaded fastener assembly including the above quick action nut, further includes the screw coaxially passing through the first through hole.

Compared with the prior art, the advantages of the present invention are as follows.

1. During the use of the nut according to the present invention, the control operating member is first switched to the second matching state, and at this time, the moving blocks fail to gather around to make the threaded hole structure. According to the present invention, the screw can easily pass through the nut and be pushed to the surface of an object to be fastened. Then, the control operating member is switched to the first matching state, at this time, the moving blocks are located at the inner ends of the radial slide ways and the threads on the moving blocks are gathered around to make a threaded hole structure matched with the screw. At this time, the nut housing and the moving blocks thereon, in a sense, form a nut that is matched with the screw, then the nut housing and the moving blocks fasten up to achieve the fastening and securing function of the nut. Conversely, if the control operating member is operated to be in the second matching state, the moving blocks cannot stay in the inner ends of the radial slide ways, which allows the nut of the present invention, which has been previously fastened to the screw, to be removed from the screw quickly. The nut of the present invention has simple structure, realizes the quick fastening and quick releasing of the nut, and is convenient in use.

2. As a further improvement of the nut of the present invention, the control operating member corresponds to a knob, which causes the limiting blocks to squeeze or not squeeze the moving blocks accordingly by rotating relative to the nut housing. Therefore, the moving blocks can be switched between two states, namely, forming the threaded hole structure or not forming the threaded hole structure. The above structure is simple and effective, and better realizes the control and operation functions of the control operating member.

3. As a further improvement of the nut of the present invention, the first squeezing inclined surface is provided at the inner side of the limiting block, the outer wall surface of the limiting block faces opposite to the inner wall surface of the nut housing. The second squeezing inclined surface matched with the first squeezing inclined surface is provided at the outer side of the moving block. The moving block has a degree of freedom of motion in the radial slide way along the direction of the first hole axis, and the moving block is sandwiched between the nut housing and the control operating member at the upper and lower ends. As the threads of the moving blocks are gathering around to fasten the screw, all of the first squeezing inclined surfaces and the second squeezing inclined surfaces are getting closer to the first hole axis in an axial translation direction. When the moving blocks fasten up, the moving blocks move in the axial direction of the screw. Under the action of the first squeezing inclined surfaces and the second squeezing inclined surfaces, the moving blocks are further squeezed toward the screw by the limiting blocks. The threads on the moving blocks tightly "hold" on the screw to realize the loose-proof function.

DETAILED DESCRIPTION OF THE EMBODIMENTS

Figure 1:
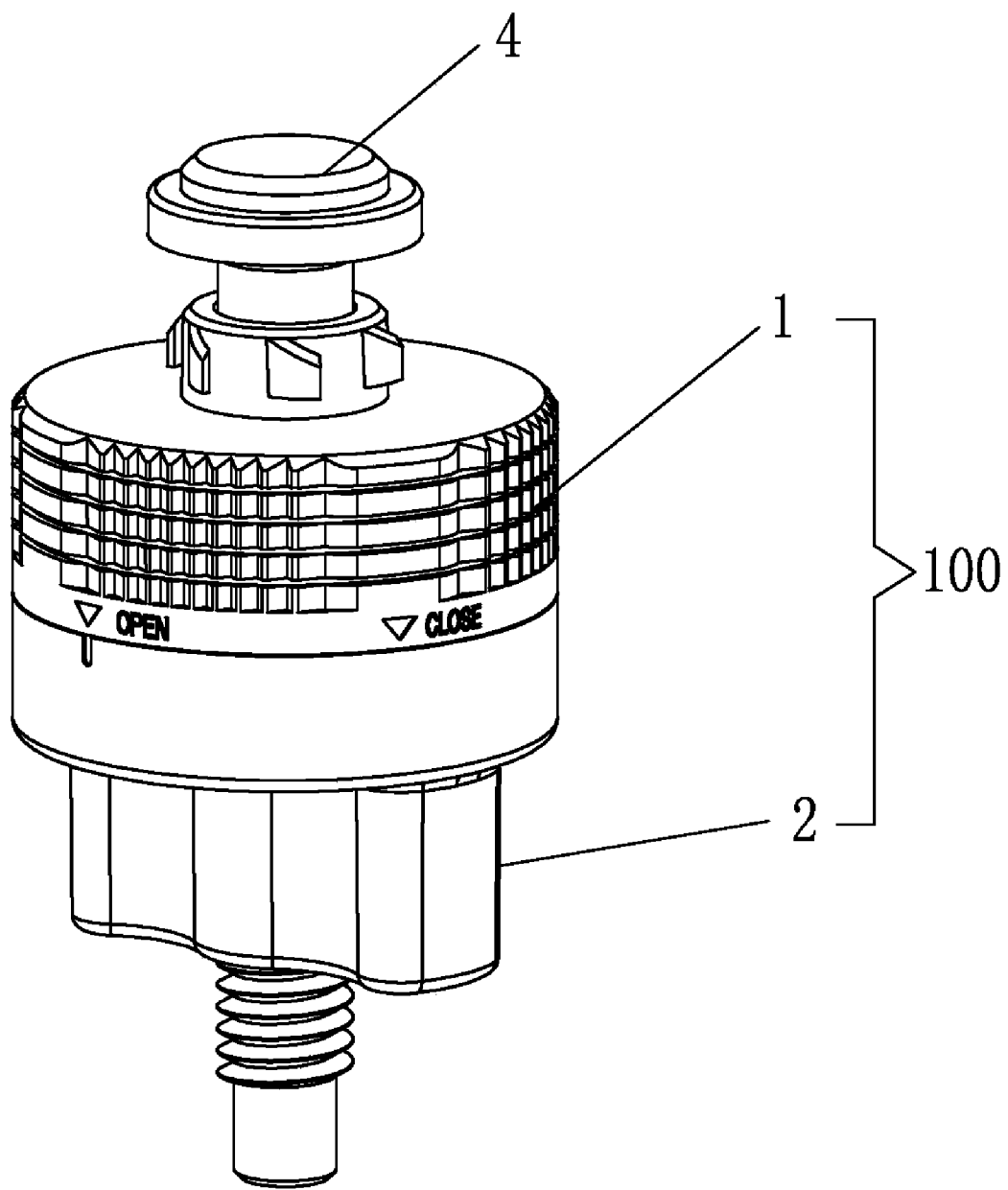
FIG. 1 is a perspective view of a threaded fastener assembly including a quick action nut according to the present invention.
Figure 2:
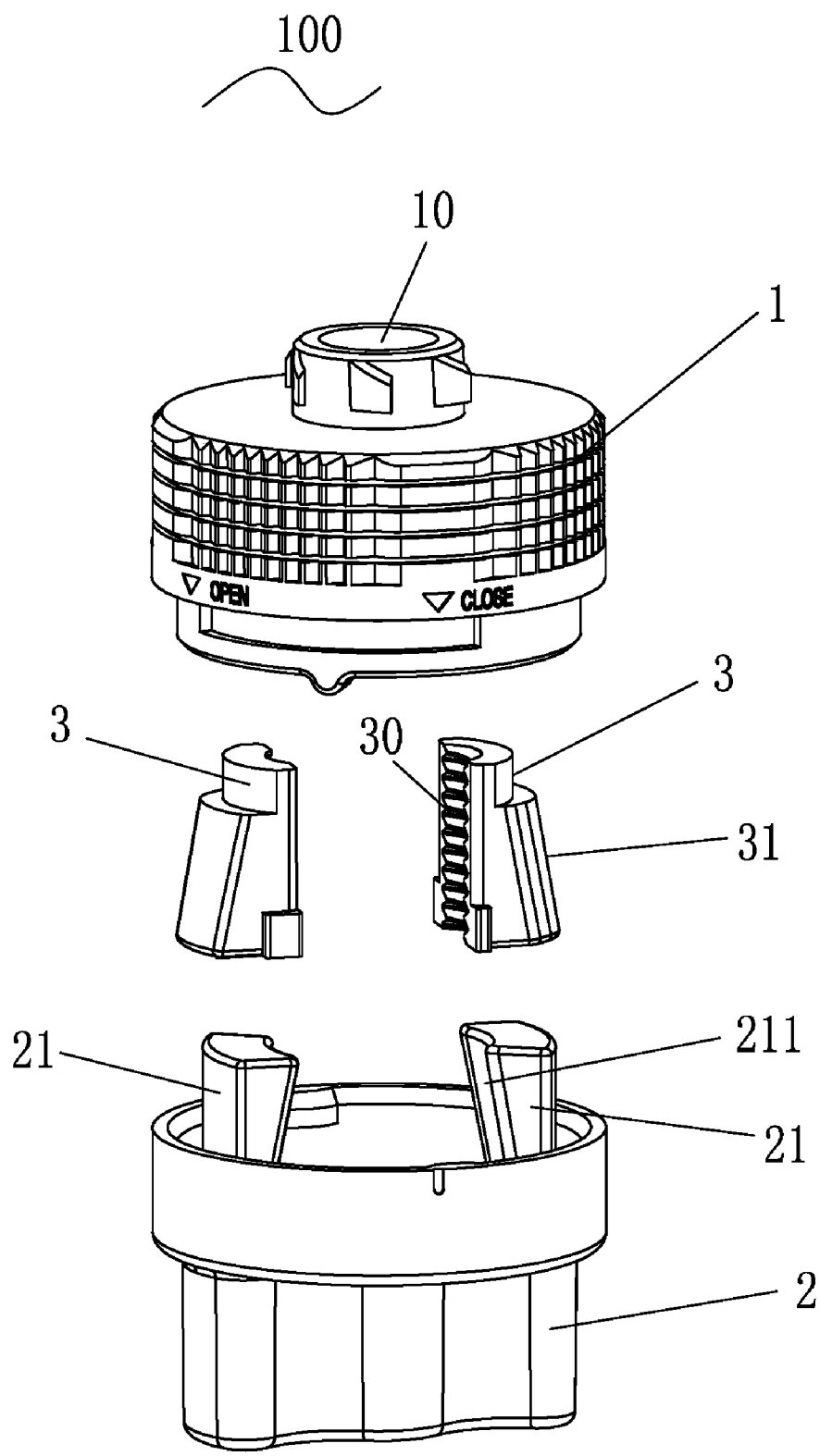
FIG. 2 is an exploded view of a nut of the present invention.
Figure 3:
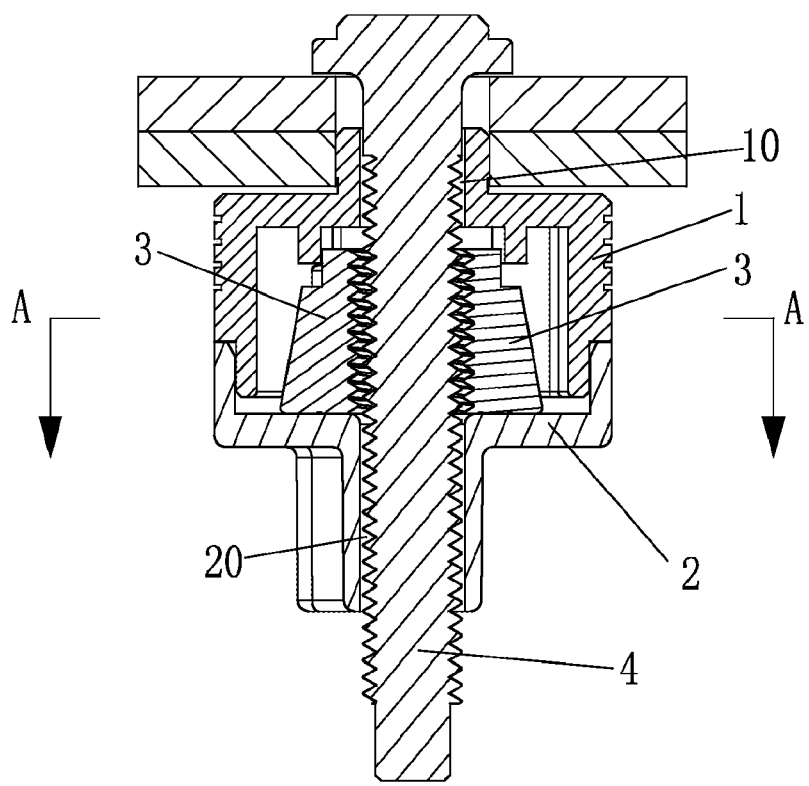
FIG. 3 is a longitudinal half-sectional structural view of a nut of the present invention when threads on the moving blocks have not yet formed a threaded hole structure matched with a screw during use.
Figure 4:
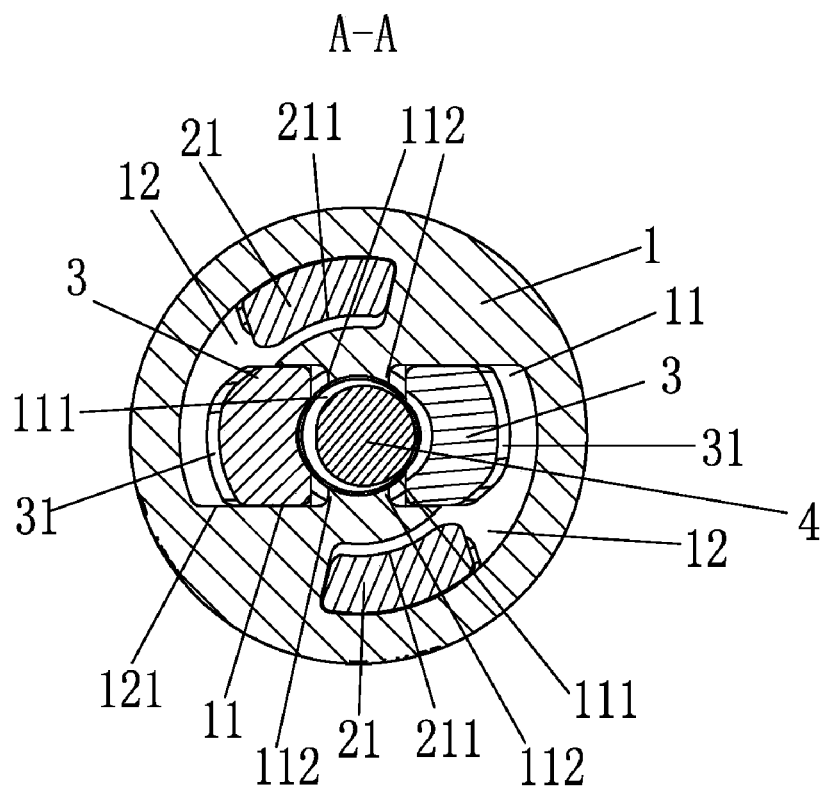
FIG. 4 is a cross-sectional view on A-A based on a complete uncut view of FIG. 3.
Figure 5:
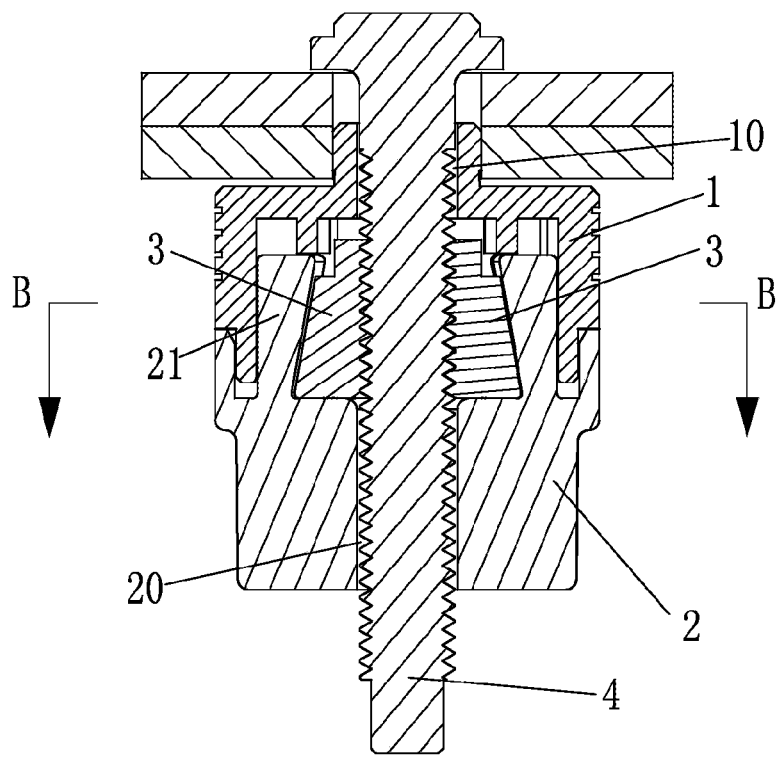
FIG. 5 is a longitudinal half-sectional structural view of a nut of the present invention during use when moving blocks are squeezed into inner ends of radial slide ways by limiting blocks.
Figure 6:
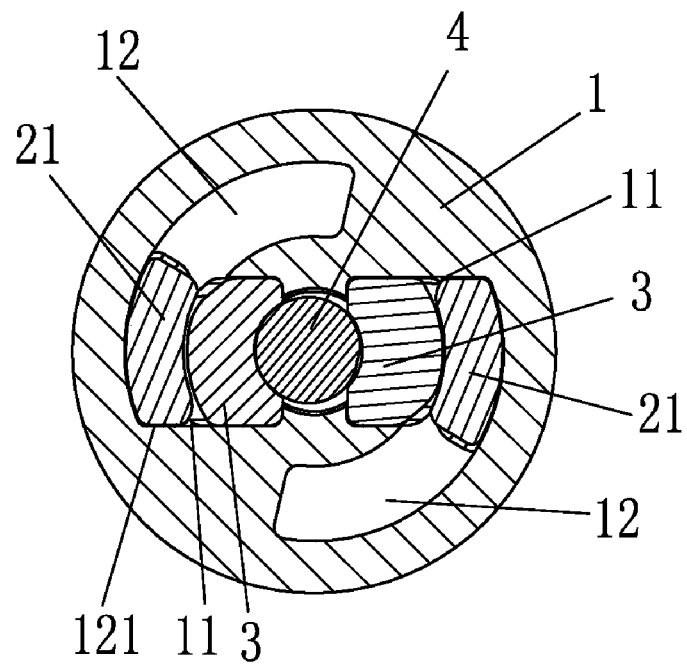
FIG. 6 is a cross-sectional view on B-B based on a complete uncut view of FIG. 5.
Figure 7:
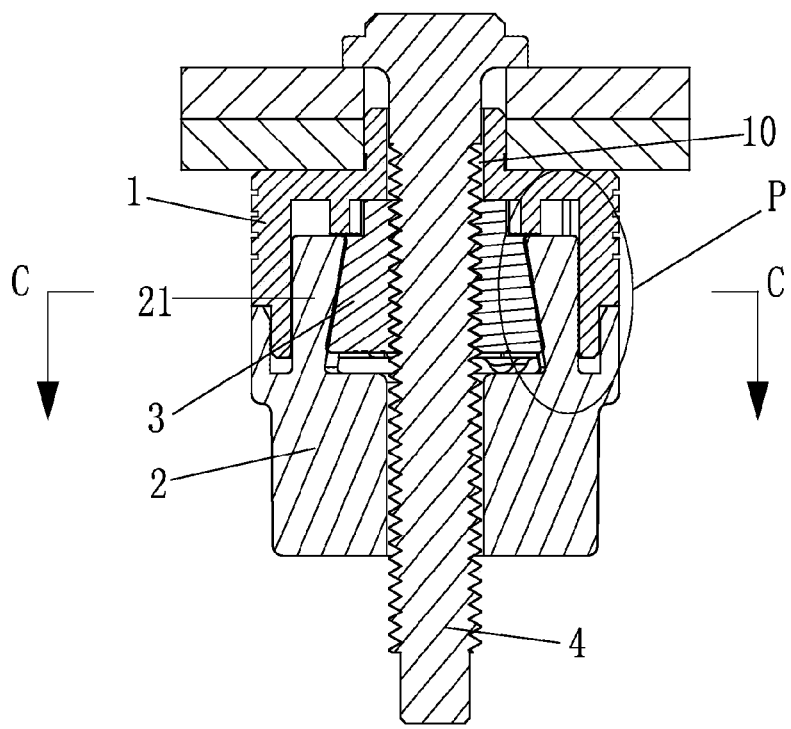
FIG. 7 is a longitudinal half-sectional structural view of a nut of the present invention during use when moving blocks are squeezed by first squeezing inclined surfaces of limiting blocks and tightly hold a screw, and the moving blocks and the limiting blocks mutually form an interference fit.
Figure 8:
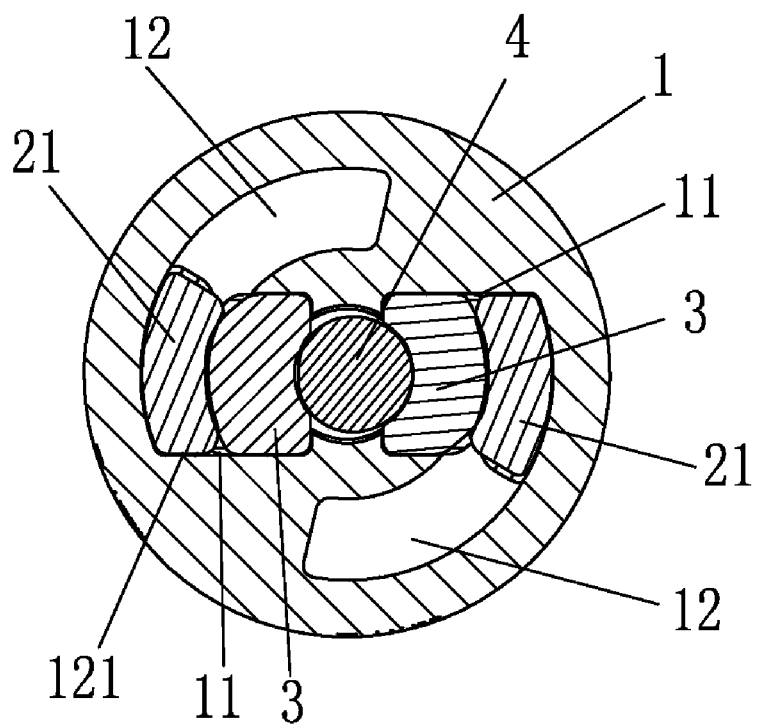
FIG. 8 is a cross-sectional view on C-C based on a complete uncut view of FIG. 7.

The present invention is further described hereinafter with reference to the embodiments shown in the drawings.

The quick action nut 100 includes the nut housing 1, the control operating member 2, and at least two moving blocks 3 movably connected inside the nut housing 1. The first through hole 10 is provided on the nut housing 1 for the screw 4 to pass through. The first through hole 10 has a first hole axis. The nut housing 1 further includes radial slide ways 11 for the moving blocks 3 to move therein in a direction perpendicular to the first hole axis. The radial slide ways 11 are equal to the moving blocks 3 in quantity. The moving blocks 3 are matched with the radial slide ways 11 in a one-to-one correspondence. The moving blocks 3 and the radial slide ways 11 are distributed around the first hole axis. The threads 30 are provided on a side of the moving block 3 facing the first hole axis. The control operating member 2 is connected to the nut housing 1 and has two matching states with the nut housing 1, and the two matching states include a first matching state and a second matching state. When the control operating member 2 and the nut housing 1 are in the first matching state, all of the moving blocks 3 are located at inner ends of the radial slide ways 11 near the first hole axis and the moving blocks 3 are held at the inner ends. When all of the moving blocks are located at the inner ends of the radial slide ways 11, the threads 30 on the moving blocks gather around to make a threaded hole structure matched with the screw. When the control operating member 2 and the nut housing 1 are in the second matching state, all of the moving blocks 3 do not stay at the inner ends of the radial slide ways 11, so the threaded hole structure is not formed. The threaded hole structure is configured as a complete threaded hole or a part of a complete threaded hole.

During the use of the nut 100 of the present invention, the control operating member 2 is first switched to the second matching state. At this time, the moving members 3 fail to gather around to make the threaded hole structure. Thus, according to the present invention, the screw can easily pass through the nut 100 and be pushed to a surface of an object to be fastened. Then, the control operating member 2 is switched to the first matching state. At this time, the moving blocks are located at the inner ends of the radial slide ways 11 and the threads 30 on the moving blocks can be gathered around to make the threaded hole structure which can be matched with the screw. At this time, the nut housing 1 and the moving blocks 2 on the nut housing, in a sense, make the nut that is matched with the screw, and then the nut housing and the moving blocks fasten up to achieve the fastening and securing function of the nut. On the contrary, if the control operating member 2 is operated to be in the second matching state, the moving blocks 3 cannot stay at the inner ends of the radial slide ways 11, which allows the nut 100 of the present invention, which has been previously fastened to the screw, to be removed from the screw quickly. The nut of the present invention has a simple structure, realizes the quick fastening and quick releasing of the nut, and is convenient in use.

Further, the second through hole 20 aligned with the first through hole 10 is provided on the control operating member 2 for the screw 4 to pass through. The control operating member 2 is connected to the nut housing 1 in a manner allowing a relative rotation around the same rotation axis. The rotation axis of the relative rotation between the control operating member 2 and the nut housing 1 coincides with the first hole axis. The control operating member 2 includes limiting blocks 21 equal to the moving blocks 3 in quantity and matched with the moving blocks 3 in a one-to-one correspondence. A rotation of the control operating member 2 relative to the nut housing 1 has two rotation limit positions including a first rotation limit position and a second rotation limit position. When the control operating member 2 is rotated relative to the nut housing 1 to the first rotation limit position, the limiting blocks 21 on the control operating member 2 squeeze the moving blocks 3 into the inner ends of the radial slide ways 11, so that the control operating member 2 and the nut housing 1 are in the first matching state. When the control operating member 2 is rotated relative to the nut housing 1 to the second rotation limit position, the limiting blocks 21 on the control operating member 2 are away from the moving blocks 3 to not match with the moving blocks 3, so that the control operating member 2 and the nut housing 1 are in the second matching state. The control operating member 2 corresponds to a knob, and the control operating member 2 is rotated relative to the nut housing 1 to make the limiting blocks 21 squeeze or not squeeze the moving blocks 3, accordingly. Therefore, the moving blocks 3 can be switched between two states, namely, forming the threaded hole structure or not forming the threaded hole structure. The control operating member functions to control the threads on the moving blocks to form or not form a threaded hole structure matched with the screw. The above structure can simply, effectively, and better realize the control operation function of the control operating member 2.

Further, in order to identify the matching states, words like "open" and "close", or other words or patterns indicate a similar meaning, are provided on an outer circumference of the nut housing 1. An indicator is provided on the control operating member 2 for indicating the states of "open" and "close". Specifically, when directing to the indicator "open", the control operating member 2 and the nut housing 1 are set to be in the second matching state; and when directing to the indicator "close", the control operating member 2 and the nut housing 1 are set to be in the first matching state.

Figure 9:
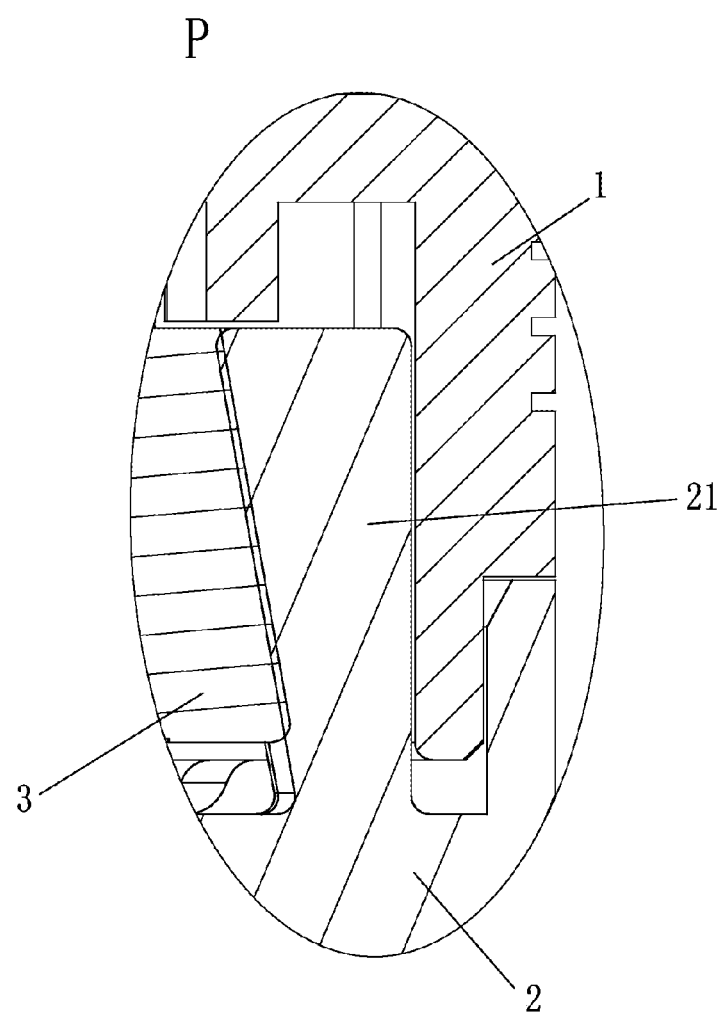
FIG. 9 is an enlarged schematic view of the portion P in FIG. 7.

Further, in order to realize the loose-proof function, the first squeezing inclined surfaces 211 are provided at inner sides of the limiting blocks 21. The outer wall surfaces of the limiting blocks 21 face opposite to the inner wall surface of the nut housing 1. The second squeezing inclined surfaces 31 matched with the first squeezing inclined surfaces 211 are provided on an outer side of the moving blocks 3. The moving blocks 3 have a degree of freedom of motion in the radial slide ways 11 along the direction of the first hole axis. The moving block 3 are sandwiched between the nut housing 1 and the control operating member 2 at the upper and lower ends. As the threads on the moving blocks 3 are gathering around to fasten the screw 4, all of the first squeezing inclined surfaces 211 and the second squeezing inclined surfaces 31 are getting closer to the first hole axis in an axial translation direction. When the moving blocks 3 fasten up, the moving blocks 3 move along the axial direction of the screw. Under an action of the first squeezing inclined surfaces 211 and the second squeezing inclined surfaces 31, the moving blocks 3 are further squeezed toward the screw by the limiting blocks 21. The threads 30 on the moving blocks 3 tightly "hold" on the screw to realize the loose-proof function. In practice, in the process of further fastening the moving blocks 3, a certain extent of interference fit is formed between the moving blocks 3 and the limiting blocks 21, as shown in FIG. 9, so a better loose-proof effect can be achieved. In the present invention, the axial translation direction of the moving blocks 3 a the threads on the moving blocks 3 are gathering around to fasten the screw 4 refers to the translational direction along the screw axis of the moving blocks 3 when the moving blocks 3 move toward the surface of the object to be fastened during use.

Further, the nut housing 1 includes arc-shaped slide ways 12 matched with the limiting blocks 21 in a one-to-one correspondence for the limiting block 21 to move therein. The arc-shaped slide ways 12 are connected to the radial slide ways 11 in a one-to-one correspondence. When the limiting blocks 21 move to the positions on the arc-shaped slide ways 12 connected to the radial slide ways 11, the control operating member 2 is at the first rotation limit position. When the limiting blocks 21 move in the arc-shaped slide ways 12 to ends away from the moving blocks 3, the control operating member 2 is at the second rotation limit position.

Further, in order to realize a synchronous operation, when the control operating member 2 is rotated relative to the nut housing 1 from the second rotation limit position to the first rotation limit position, a rotation direction of the control operating member 2 is identical to the rotation directions of the moving blocks 3 when the threads 30 of the moving blocks 3 are gathering around to fasten the screw. The limiting surface 121 for constraining a further rotation of the control operating member 2 relative to the nut housing 1 when the control operating member 2 is at the first rotation limit position is provided in the nut housing 1. When the nut 100 of the present invention is operated to fasten up, the control operating member 2 can be rotated continually to fasten up the nut 100, thereby simplifying the operation. The rotation direction mentioned in the present invention when the threads of the moving blocks 3 gather around to fasten the screw refers to the rotation direction that is required by the moving blocks 3 to tightly press against the surface of the object to be fastened during use. Specifically, the rotation direction is a clockwise or counterclockwise direction.

Further, in order to facilitate the entry of the limiting block 21 into the position where the limiting block 21 is matched with the moving block 3, the inner wall surface of the limiting block 21 is matched with the outer wall surface of the moving block 3 in shape, and the inner wall surface of the limiting block 21 and the outer wall surface of the moving block 3 are both cylindrical surfaces. Two sides of both of the inner wall surface of the limiting block 21 and the outer wall surface of the moving block 3 are formed with a round corner.

Further, a pair of the moving blocks 3 are provided, a pair of the arc-shaped slide ways 12 are provided, a pair of the radial slide ways 11 are provided, and the outer ends of the radial slide ways 11 away from the first hole axis are connected to the arc-shaped slide ways 12 in a one-to-one correspondence.

Further, the opening 111 is provided at an end side of the inner end of the radial slide way 11, and a width of the opening 111 is smaller than a width of the inner end of the radial slide way 11. The limiting shoulders 112 are provided at two ends of the opening 111. The inner ends of all the radial sliding ways 11 are interconnected through the openings 111. The width of the opening 111 is smaller than the width of the inner end, and the limiting shoulders 112 on both sides of the opening 111 prevent the moving blocks 3 from becoming too close to the first hole axis, thereby preventing the moving blocks 3 from overly blocking the first through hole 10 to affect the insertion of the screw.

A threaded fastener assembly including the above quick action nut, further includes the screw 4 coaxially passing through the first through hole 10.

What is claimed is:

1. A quick action nut, comprising a nut housing, a control operating member, and at least two moving blocks movably connected inside the nut housing,
wherein, the nut housing has a first through hole for a screw to pass through, the first through hole has a first hole axis;
the nut housing further comprises radial slide ways for the moving blocks to move inside the radial slide ways in a direction perpendicular to the first hole axis, the radial slide ways are equal to the moving blocks in quantity, the moving blocks are matched with the radial slide ways in a one-to-one correspondence, the moving blocks and the radial slide ways are distributed around the first hole axis, threads are provided on a side of each moving block facing the first hole axis, the control operating member is connected to the nut housing and has two matching states with the nut housing; and
the two matching states comprise a first matching state and a second matching state; when the control operating member and the nut housing are in the first matching state, all of the moving blocks are located at inner ends of the radial slide ways near the first hole axis and are held at the inner ends; when all of the moving blocks are located at the inner ends of the radial slide ways, the threads on the moving blocks gather around the screw to make a threaded hole structure matched with the screw; when the control operating member and the nut housing are in the second matching state, all of the moving blocks do not stay at the inner ends of the radial slide ways, and the threaded hole structure is not formed;
wherein, a second through hole aligned with the first through hole is provided on the control operating member for the screw to pass through, the control operating member is connected to the nut housing in a manner allowing a relative rotation around a same rotation axis, the rotation axis of the relative rotation between the control operating member and the nut housing coincides with the first hole axis, and the control operating member comprises limiting blocks equal to the moving blocks in quantity and matched with the moving blocks in a one-to-one correspondence; and
a rotation of the control operating member relative to the nut housing has two rotation limit positions comprising a first rotation limit position and a second rotation limit position; when the control operating member is rotated relative to the nut housing to the first rotation limit position, the limiting blocks on the control operating member squeeze the moving blocks into the inner ends of the radial slide ways to make the control operating member and the nut housing be in the first matching state; when the control operating member is rotated relative to the nut housing to the second rotation limit position, the limiting blocks on the control operating member are away from the moving blocks to not match with the moving blocks, so that the control operating member and the nut housing are in the second matching state;
wherein, a first squeezing inclined surface is provided at an inner side of each limiting block, an outer wall surface of each limiting block faces opposite to an inner wall surface of the nut housing, a second squeezing inclined surface matched with the first squeezing inclined surface is provided at an outer side of each moving block, the moving blocks have a degree of freedom of motion in the radial slide ways along a direction of the first hole axis, and the moving blocks are sandwiched between the nut housing and the control operating member at upper and lower ends;
as the threads of the moving blocks are gathering around the screw to fasten the screw, all of the first squeezing inclined surfaces and the second squeezing inclined surfaces are becoming closer to the first hole axis while moving in an axial translation direction.

2. The quick action nut of claim 1, wherein, when the control operating member is rotated relative to the nut housing from the second rotation limit position to the first rotation limit position, a rotation direction of the control operating member is identical to a rotation direction of the moving blocks when the threads of the moving blocks gather around the screw to fasten the screw, and the nut housing comprises a limiting surface for constraining a further rotation of the control operating member relative to the nut housing when the control operating member is at the first rotation limit position.

3. The quick action nut of claim 1, wherein, inner wall surfaces of the limiting blocks are matched with outer wall surfaces of the moving blocks in shape, the inner wall surfaces of the limiting blocks and the outer wall surfaces of the moving blocks are both conical surfaces, and two sides of both of the inner wall surfaces of the limiting blocks and the outer wall surfaces of the moving blocks are formed with round corners.

4. The quick action nut of claim 1, wherein, an opening is provided at an end side of the inner end of each radial slide way, a width of the opening is smaller than a width of the inner end of each radial slide way, limiting shoulders are provided at two ends of the opening, and the inner ends of all the radial sliding ways are interconnected through the openings.

5. A threaded fastener assembly comprising the quick action nut of claim 1, wherein the threaded fastener assembly further comprises the screw passing coaxially through the first through hole.

6. The threaded fastener assembly of claim 5,
wherein, the nut housing comprises arc-shaped slide ways matched with the limiting blocks in a one-to-one correspondence for the limiting blocks to move in the arc-shaped slide ways, and the arc-shaped slide ways are connected to the radial slide ways in a one-to-one correspondence; when the limiting blocks move to positions on the arc-shaped slide ways connected to the radial slide ways, the control operating member is at the first rotation limit position; and when the limiting blocks move in the arc-shaped slide ways to ends away from the moving blocks, the control operating member is at the second rotation limit position.

7. The threaded fastener assembly of claim 6, wherein, a pair of the moving blocks are provided, a pair of the arc-shaped slide ways are provided, a pair of the radial slide ways are provided, and outer ends of the radial slide ways away from the first hole axis are connected to the arc-shaped slide ways in a one-to-one correspondence.

8. The threaded fastener assembly of claim 5,
wherein, when the control operating member is rotated relative to the nut housing from the second rotation limit position to the first rotation limit position, a rotation direction of the control operating member is identical to a rotation direction of the moving blocks when the threads of the moving blocks gather around the screw to fasten the screw, and the nut housing comprises a limiting surface for constraining a further rotation of the control operating member relative to the nut housing when the control operating member is at the first rotation limit position.

9. The threaded fastener assembly of claim 5,
wherein, inner wall surfaces of the limiting blocks are matched with outer wall surfaces of the moving blocks in shape, the inner wall surfaces of the limiting blocks and the outer wall surfaces of the moving blocks are both conical surfaces, and two sides of both of the inner wall surfaces of the limiting blocks and the outer wall surfaces of the moving blocks are formed with round corners.

10. The threaded fastener assembly of claim 5,
wherein, an opening is provided at an end side of the inner end of each radial slide way, a width of the opening is smaller than a width of the inner end of each radial slide way, limiting shoulders are provided at two ends of the opening, and the inner ends of all the radial sliding ways are interconnected through the openings.

11. A quick action nut, comprising a nut housing, a control operating member, and at least two moving blocks movably connected inside the nut housing,
wherein, the nut housing has a first through hole for a screw to pass through, the first through hole has a first hole axis;
the nut housing further comprises radial slide ways for the moving blocks to move inside the radial slide ways in a direction perpendicular to the first hole axis, the radial slide ways are equal to the moving blocks in quantity, the moving blocks are matched with the radial slide ways in a one-to-one correspondence, the moving blocks and the radial slide ways are distributed around the first hole axis, threads are provided on a side of each moving block facing the first hole axis, the control operating member is connected to the nut housing and has two matching states with the nut housing; and
the two matching states comprise a first matching state and a second matching state; when the control operating member and the nut housing are in the first matching state, all of the moving blocks are located at inner ends of the radial slide ways near the first hole axis and are held at the inner ends; when all of the moving blocks are located at the inner ends of the radial slide ways, the threads on the moving blocks gather around the screw to make a threaded hole structure matched with the screw; when the control operating member and the nut housing are in the second matching state, all of the moving blocks do not stay at the inner ends of the radial slide ways, and the threaded hole structure is not formed;
wherein, a second through hole aligned with the first through hole is provided on the control operating member for the screw to pass through, the control operating member is connected to the nut housing in a manner allowing a relative rotation around a same rotation axis, the rotation axis of the relative rotation between the control operating member and the nut housing coincides with the first hole axis, and the control operating member comprises limiting blocks equal to the moving blocks in quantity and matched with the moving blocks in a one-to-one correspondence;
a rotation of the control operating member relative to the nut housing has two rotation limit positions comprising a first rotation limit position and a second rotation limit position; when the control operating member is rotated relative to the nut housing to the first rotation limit position, the limiting blocks on the control operating member squeeze the moving blocks into the inner ends of the radial slide ways to make the control operating member and the nut housing be in the first matching state; when the control operating member is rotated relative to the nut housing to the second rotation limit position, the limiting blocks on the control operating member are away from the moving blocks to not match with the moving blocks, so that the control operating member and the nut housing are in the second matching state;
wherein, the nut housing comprises arc-shaped slide ways matched with the limiting blocks in a one-to-one correspondence for the limiting blocks to move in the arc-shaped slide ways, and the arc-shaped slide ways are connected to the radial slide ways in a one-to-one correspondence; when the limiting blocks move to positions on the arc-shaped slide ways connected to the radial slide ways, the control operating member is at the first rotation limit position; and when the limiting blocks move in the arc-shaped slide ways to ends away from the moving blocks, the control operating member is at the second rotation limit position.

12. A quick action nut, comprising a nut housing, a control operating member, and at least two moving blocks movably connected inside the nut housing, wherein, the nut housing has a first through hole for a screw to pass through, the first through hole has a first hole axis;

the nut housing further comprises radial slide ways for the moving blocks to move inside the radial slide ways in a direction perpendicular to the first hole axis, the radial slide ways are equal to the moving blocks in quantity, the moving blocks are matched with the radial slide ways in a one-to-one correspondence, the moving blocks and the radial slide ways are distributed around the first hole axis, threads are provided on a side of each moving block facing the first hole axis, the control operating member is connected to the nut housing and has two matching states with the nut housing;

the two matching states comprise a first matching state and a second matching state; when the control operating member and the nut housing are in the first matching state, all of the moving blocks are located at inner ends of the radial slide ways near the first hole axis and are held at the inner ends; when all of the moving blocks are located at the inner ends of the radial slide ways, the threads on the moving blocks gather around the screw to make a threaded hole structure matched with the screw; when the control operating member and the nut housing are in the second matching state, all of the moving blocks do not stay at the inner ends of the radial slide ways, and the threaded hole structure is not formed;

wherein, a second through hole aligned with the first through hole is provided on the control operating member for the screw to pass through, the control operating member is connected to the nut housing in a manner allowing a relative rotation around a same rotation axis, the rotation axis of the relative rotation between the control operating member and the nut housing coincides with the first hole axis, and the control operating member comprises limiting blocks equal to the moving blocks in quantity and matched with the moving blocks in a one-to-one correspondence;

a rotation of the control operating member relative to the nut housing has two rotation limit positions comprising a first rotation limit position and a second rotation limit position; when the control operating member is rotated relative to the nut housing to the first rotation limit position, the limiting blocks on the control operating member squeeze the moving blocks into the inner ends of the radial slide ways to make the control operating member and the nut housing be in the first matching state; when the control operating member is rotated relative to the nut housing to the second rotation limit position, the limiting blocks on the control operating member are away from the moving blocks to not match with the moving blocks, so that the control operating member and the nut housing are in the second matching state;

wherein, the nut housing comprises arc-shaped slide ways matched with the limiting blocks in a one-to-one correspondence for the limiting blocks to move in the arc-shaped slide ways, and the arc-shaped slide ways are connected to the radial slide ways in a one-to-one correspondence;

when the limiting blocks move to positions on the arc-shaped slide ways connected to the radial slide ways, the control operating member is at the first rotation limit position; and when the limiting blocks move in the arc-shaped slide ways to ends away from the moving blocks, the control operating member is at the second rotation limit position; and wherein, a pair of the moving blocks are provided, a pair of the arc-shaped slide ways are provided, a pair of the radial slide ways are provided, and outer ends of the radial slide ways away from the first hole axis are connected to the arc-shaped slide ways in a one-to-one correspondence.

\* \* \* \* \*